United States Patent [19]
Mogilnicki

[11] Patent Number: 5,335,556
[45] Date of Patent: Aug. 9, 1994

[54] TIGTHENING FIXTURE WITH BUILT-IN TORQUE READOUT DEVICE

[75] Inventor: Victor D. Mogilnicki, Raleigh, N.C.

[73] Assignee: Kennametal Inc., Latrobe, Pa.

[21] Appl. No.: 965,256

[22] PCT Filed: Jul. 1, 1991

[86] PCT No.: PCT/US91/04688
§ 371 Date: Jan. 6, 1993
§ 102(e) Date: Jan. 6, 1993

[87] PCT Pub. No.: WO92/01213
PCT Pub. Date: Jan. 23, 1992

[51] Int. Cl.[5] ............................................. G01L 5/24
[52] U.S. Cl. ............................... 73/862.21; 73/862.08; 29/721
[58] Field of Search ................. 73/847, 862.08, 862.21, 73/862.23, 761, 862.191; 29/240, 243

[56] References Cited

U.S. PATENT DOCUMENTS

| | | | |
|---|---|---|---|
| 2,300,288 | 10/1942 | Hullhorst | 73/862.191 |
| 3,044,322 | 7/1962 | George | 408/16 |
| 3,232,101 | 2/1966 | Siegler | 73/862.191 |
| 3,448,988 | 6/1969 | Athanasiou | 408/16 X |
| 3,552,198 | 1/1971 | Friedland | 73/862.191 X |
| 4,193,720 | 3/1980 | Machida | 408/11 |
| 4,304,510 | 12/1981 | Machida | 408/16 X |

FOREIGN PATENT DOCUMENTS

| | | |
|---|---|---|
| 56-094234 | 7/1981 | Japan . |
| 57-073644 | 5/1982 | Japan . |
| 2238623 | 5/1991 | United Kingdom . |

OTHER PUBLICATIONS

Soviet Engineering Research, (Stanki I Instrumenty & Vestnik Mashinostroenia Mashinostrocnie) vol. 11, No. 7, 1991, New York, USA, pp. 152–153, Yu. Kh. Amirdzhanov, E. A., "Device for Measuring Forces on Machine Tool Control Levers".

Primary Examiner—Herbert Goldstein
Assistant Examiner—Elizabeth L. Dougherty
Attorney, Agent, or Firm—James G. Porcelli

[57] ABSTRACT

A tightening fixture for tightening a lock nut on a chuck including a torque readout device for measuring the torque applied to tighten the lock nut. The tightening fixture includes a stationary support block having a torque transmitting collar rotatively mounted therein. The torque transmitting collar is designed to receive and hold the chuck so that the chuck is held nonrotatable with respect to the collar. When torque is applied to tighten the lock nut on the chuck, the chuck and collar rotate as a unit. A torque indicator is mounted in the stationary block and is responsive to the rotation of the torque transmitting collar to provide an indication of the torque applied to tighten the lock nut.

13 Claims, 9 Drawing Sheets

TIGTHENING FIXTURE WITH BUILT-IN TORQUE READOUT DEVICE

This application is a Continuation-in-Part of U.S. Pat. application Ser. No. 07/549,348 filed Jul. 06, 1990, entitled "Tightening Fixture with Built-In Torque Readout Device," now U.S. Pat. No. 5,109,706.

BACKGROUND OF THE INVENTION

The present invention relates to a tightening fixture for a chuck. More particularly, the present invention relates to a built-in torque readout device for measuring the torque applied to tighten the lock nut of a chuck.

In high speed tooling, it is important to tighten the lock nut of a chuck to a specified torque. If the lock nut is not tightened sufficiently, the tool may come loose during operation posing a hazardous threat to anyone standing nearby. On the other hand, over-tightening may cause damage to the tool or chuck.

Tightening fixtures are currently in use to assist tightening of a lock nut on a chuck. Generally speaking, a tightening fixture comprises a stationary block having an opening formed therein to receive a toolholder or chuck. Typically, the toolholder will include a flange having one or more keyways. Keys fixed to the stationary block engage the keyways on the toolholder to prevent rotation of the toolholder, relative to the tightening fixture. Thus, the tightening fixture functions in a manner similar to a vice or clamp to hold the toolholder in a fixed position as the lock nut is tightened.

Currently, there are no tightening fixtures which have the capability of measuring the tightening torque applied to tighten the lock nut on a chuck. Torque is determined by using a conventional torque wrench to tighten the lock nut. However, a torque wrench may not always be available when it is needed. Further, torque wrenches cannot be used in all applications.

SUMMARY AND OBJECTS OF THE INVENTION

The present invention eliminates the need for torque wrenches to measure tightening torque by incorporating a torque measuring device into the tightening fixture.

One embodiment of the torque measuring device of the present invention includes a dial indicator mounted in a stationary block at a predetermined radius from the center of the block. A torque transmitting collar is rotatably mounted in a stationary block and is adapted to receive and hold the chuck. When torque is applied to tighten the lock nut on the chuck, the collar rotates against an actuator rod which in turn pushes against the dial indicator resulting in a corresponding movement of the dial indicator's pointer.

A second embodiment of the torque measuring device includes a cantilevered member with a strain gauge attached to it. The member is mounted in the stationary block and protrudes into a notch in a torque transmitting collar rotatably mounted in the stationary block. The collar is adapted to receive and hold the chuck. By deflection of the cantilevered member caused by rotation of the collar, the applied torque can be determined.

Based on the foregoing, it is a primary object of the present invention to provide a tightening fixture for tightening a lock nut on a chuck having a built in torque measuring device.

Another object of the present invention is to provide a tightening fixture for tightening a lock nut on a chuck which is adapted to receive various sizes of chucks.

Another object of the present invention is to provide a tightening fixture for tightening a lock nut on a chuck having a relatively simple construction with few moving parts.

Another object of the present invention is to provide a tightening fixture for tightening a lock nut on a chuck which is easy to use.

Other objects and advantages of the present invention will become apparent and obvious from a study of the following description and the accompanying drawings which are merely illustrative of such invention.

DETAILED DESCRIPTION OF THE DRAWINGS

Figure 1:
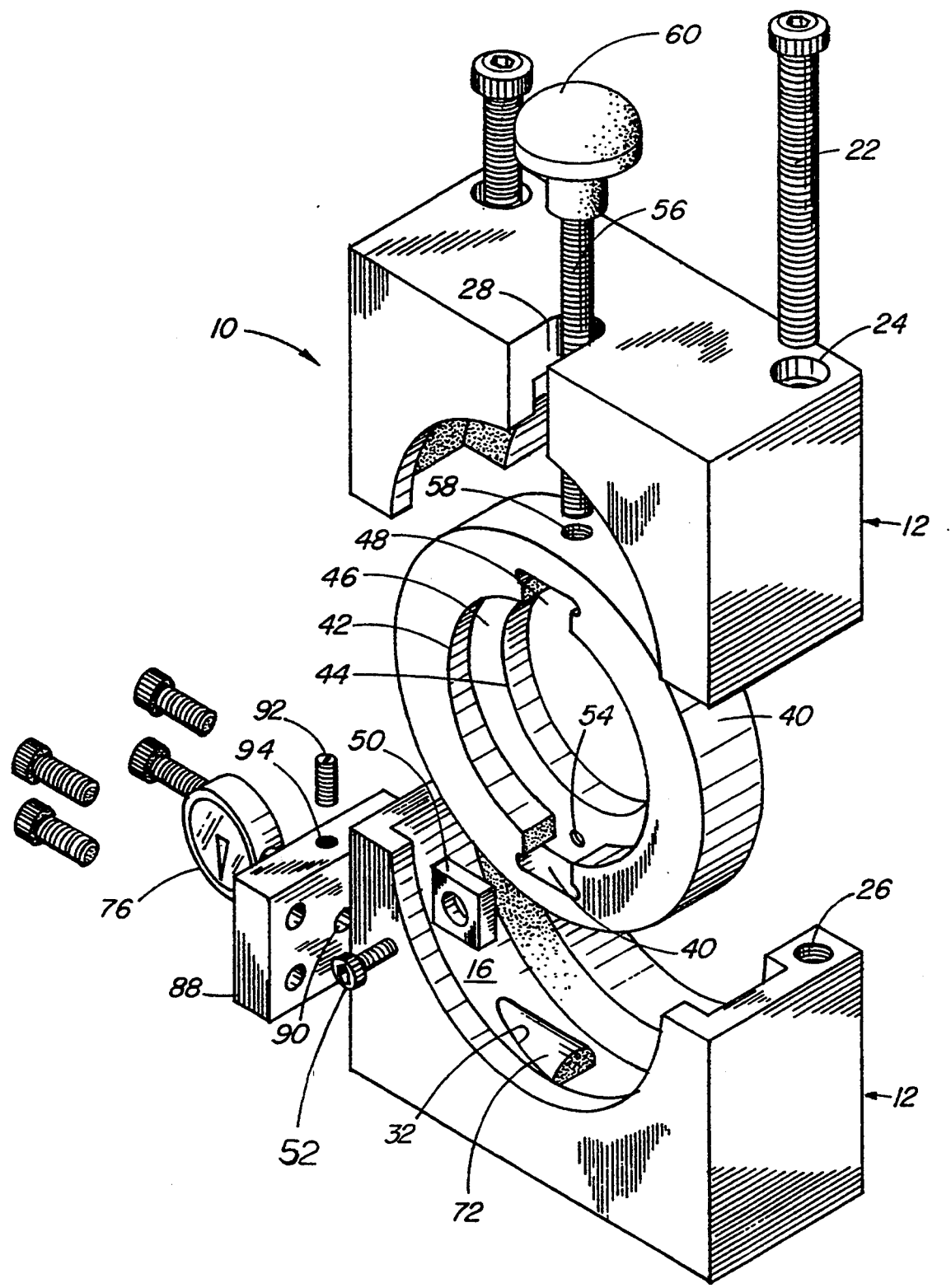
FIG. 1 is an exploded perspective view of a first embodiment of the tightening fixture.

Referring now to the drawings, the tightening fixture of the present invention is shown therein and indicated generally by the numeral 10. The tightening fixture 10 is used for tightening the lock nut of a conventional chuck. Generally speaking, the chuck includes a tapered rear end and a forward end separated by a flange. A tapered bore is formed in the front end for receiving a collet. A lock nut is threaded on the front end of the chuck. When the lock nut is tightened, the collet is forced into the tapered bore to compress the collet into gripping engagement with a tool. Such a chuck is shown in, and will be discussed with, FIG. 6. The tightening fixture 10 of the present invention includes a built-in torque measuring device for indicating the amount of torque applied to tighten the lock nut.

The tightening fixture 10 includes a generally stationary support block 12; a torque transmitting collar 40 rotatably mounted in the support block 12 for receiving and holding the chuck; a locking means 50 for holding the chuck nonrotatable with respect to the torque transmitting collar 40; and a torque indicator assembly 76 mounted in the stationary block and responsive to the rotation of the torque transmitting collar 40 for indicating the torque applied to the lock nut.

The support block 12 is a block that may be made of low carbon steel. The support block 12 is formed with a central opening 14 extending therethrough from the front face to the back face. The wall of the central opening 14 is formed with a continuous, annular channel 16 for receiving the torque transmitting collar 40.

The support block 12 is constructed in two parts—a top half 18 and a bottom half 20. The top half 18 rests on top of the bottom half 20 and the two halves are secured by a pair of securing bolts 22. The securing bolts 22 pass through recessed through-holes 24 in the top half 18 and screw into threaded holes 26 in the bottom half 20. The top half 18 is also formed with a lock screw notch 28 extending from the front face of the block 12 to accommodate a chuck lock screw 56 which is described below.

The bottom half 20 of the support block 12 includes an actuator rod hole 30 which extends from one side face of the support block 12 and intersects the annular channel 16 at its lowermost point forming an elliptical opening 32 in the bottom of the channel 16. The opposite end of the actuator rod hole 30 opens to a recess 34. A shoulder 36 joins the cylindrical wall of the recess 34 with the actuator rod hole 30. Preferably, the actuator rod hole 30 extends tangentially with respect to the annular channel 16. In other words, the axis of the actuator rod hole 30 is tangent to the annular channel 16.

Figure 4A:
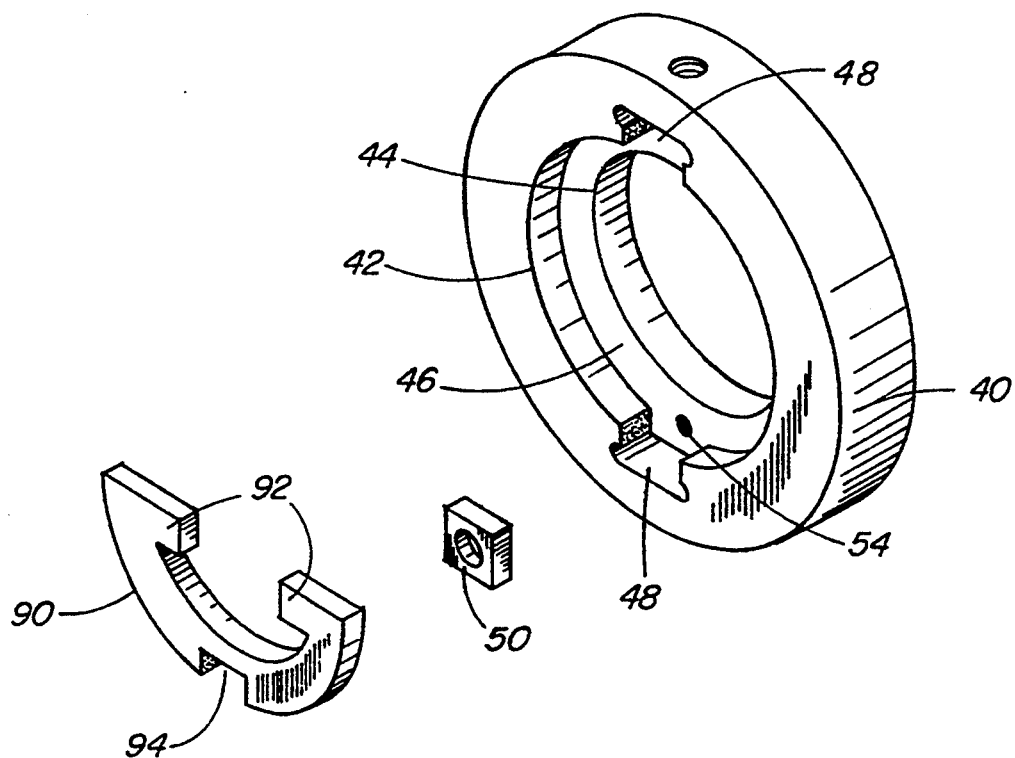
FIG. 4A is a perspective view of the torque transmitting collar and adapter plate used in the present invention.
Figure 4B:
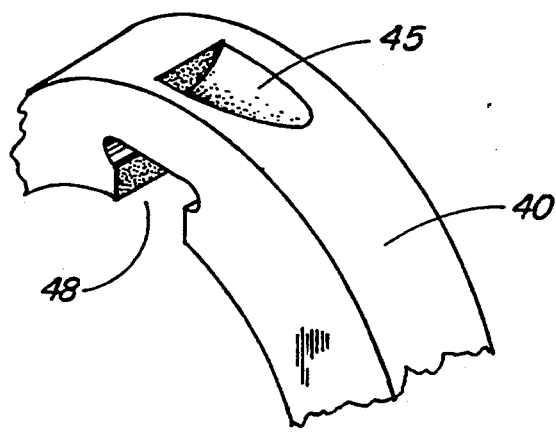
FIG. 4B is a partial perspective view illustrating the bottom side of the torque transmitting collar.

Referring now to the torque transmitting collar 40, which is seen best in FIGS. 4A and 4B, it is seen that the collar 40 is circular shaped. The outer diameter of the collar 40 is slightly smaller than the diameter of the annular channel 16 of the support block 12 so as to allow the collar 40 to rotate freely in the channel 16. A stepped opening including a forward portion 42 and a rearward portion 44 is formed in the collar 40. A forwardly facing step or shoulder 46 is formed between the forward and rearward portions 42 and 44 of the stepped opening.

The rearward portion 44 of the opening is sized to allow the tapered end of the chuck to pass freely therethrough but is smaller than the flange of the chuck. The forward portion 42 of the stepped opening is sized large enough to accommodate the flange of the chuck. Two keyways 48 are formed in the forward portion 42 of the collar 40 at diametrically opposed locations. As shown in FIG. 1, a key 50 is fixed in the lowermost keyway 48 and is secured by a key bolt 52 which screws into a threaded key bolt hole 54 in shoulder 46. The key 50 is adapted to engage with a keyway formed in the flange of the chuck so as to hold the chuck nonrotatable with respect to the collar 40.

A radially extending lock screw hole 58 is formed in the collar 40 at a point diametrically opposed to the key 50. A chuck lock screw 56 is threaded into the lock screw hole 58 in the collar 40 and passes through the uppermost keyway 48. The chuck lock screw 56 is adapted to engage one of the keyways in the flange of the chuck to secure the chuck in the collar 40. The chuck lock screw 56 is a conventional hand toggle screw having a hand grip 60 thereon for gripping and turning the screw. The screw extends upwardly from the collar and passes through the lock screw notch 28 in the top half 18 of the support block 12. The lock screw notch 28, therefore, should be of sufficient size to allow for the movement of the chuck lock screw 56 as the collar 40 is rotated in the support block 12.

Figure 2:
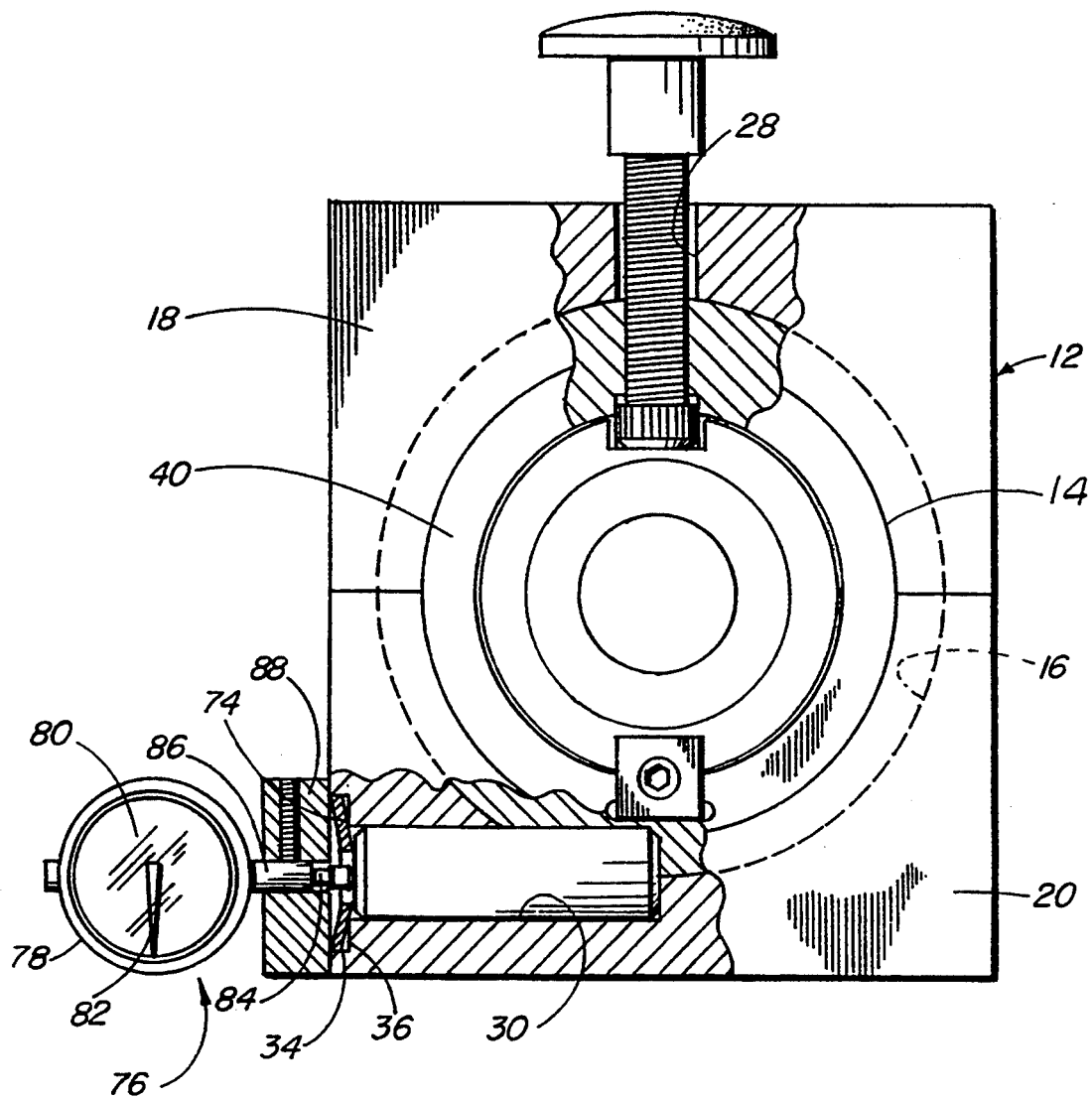
FIG. 2 is a front elevation view of the first embodiment of the tightening fixture with portions thereof shown in sections to illustrate the invention.
Figure 3:
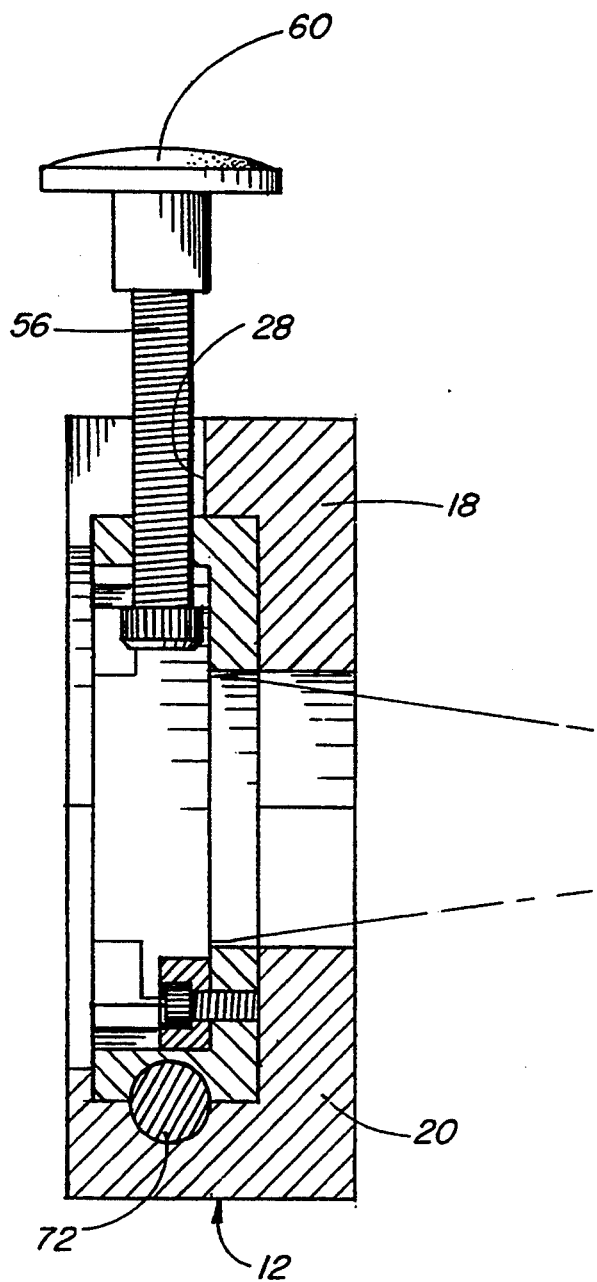
FIG. 3 is a section view of the first embodiment of the tightening fixture taken through a plane parallel to the sides of the support block.

Referring now to the first embodiment of the torque indicator assembly, which is indicated generally in FIG. 2 by the number 70, the same includes an actuator rod 72, a resistance element 74, and a torque indicator 76.

The actuator rod 72 is disposed in the actuator rod hole 30 in the support block 12 and moves axially therein. One end of the actuator rod 72 is engaged with the notch 45 on the torque transmitting collar 40. The opposite end of the actuator rod pushes simultaneously against the resistance element 74 and torque indicator 76. The resistance element may be a disc spring to resist axial displacement of the actuator rod 72. The spring constant of the spring will, of course, affect the calibration of the torque indicator 76 since a higher spring constant means greater force is required to move the actuator rod 72. Thus, care should be exercised in selection of a disc spring with any appropriate spring rate.

Referring now to the torque indicator 76, it is a conventional torque indicator, or displacement measuring means, including a torque head 78 with a scale on its face 80. A pointer 82 moves circularly on the face 80 to indicate displacement of the actuator rod 72 against the resistance element 74. Knowing the displacement and also the spring rate of the resistance element 74, a force exerted by the actuator rod 72 may be determined, and torque may then be calculated, by the product of the displacement and force. The pointer 82 is operatively connected to a push rod 84 extending through the stem 86 of the indicator 76. When the push rod 84 is depressed, the pointer 82 moves correspondingly. The scale on the face 80 of the torque indicator may be incremented so that the reading on the face will be shown as torque. Torque indicators of this type are well known to those skilled in the art and a more detailed description is therefore omitted for the sake of brevity.

The torque indicator 76 is mounted to the side of the support block 12 by means of an indicator mounting block 88. The indicator mounting block 88 includes a stem opening 90 for receiving the stem 86 of the indicator 76. A set screw 92 (FIG. 1) threaded into a set screw hole 94 in the indicator mounting block 88 secures the torque indicator 76. In addition to mounting the torque indicator 76, the indicator mounting block 88 retains the resistance element in the recess 34 of the stationary block 12.

From the forgoing, it is apparent that the axial displacement of the actuator rod 72 by the torque transmitting collar 40 causes a corresponding movement of the pointer 82. The torque indicator 76 is calibrated by placing the actuator rod 72 at the proper radius from the center of the tightening fixture and selecting a disc spring with the proper spring rate as the resistance element 74. In the embodiment shown, the actuator rod 72 is placed at a three inch radius from the center of the fixture 10 and the spring rate of the resistance element 74 is 40,000 lbs/inch. Thus, a 0.001 inch movement of the actuator rod 72 equals ten foot pounds of torque.

Since chucks come in many different sizes, the present invention includes an adapter. Referring to FIG. 4A, there is shown an adapter plate 96 which is used in connection with the present invention to adapt the collar 40 to receive chucks of various sizes. The adapter plate 96 is an arcuate-shaped plate having two inwardly extending prongs 98 adapted to engage the keyways in a conventional chuck. A keyway 100 is formed at the bottom of the adapter plate 96 and mates with the key 50 which is fixed to the collar 40.

The adapter plate 96 inserts into the forward portion 42 of the collar 40 until it makes face-to-face contact with the shoulder 46. The key 50 fixed to the collar 40 prevents rotation of the adapter plate 96 with respect to collar 40. Similarly, the inwardly projecting prongs 98 engage the keyways in the chuck to prevent the chuck from rotating.

Figure 5:
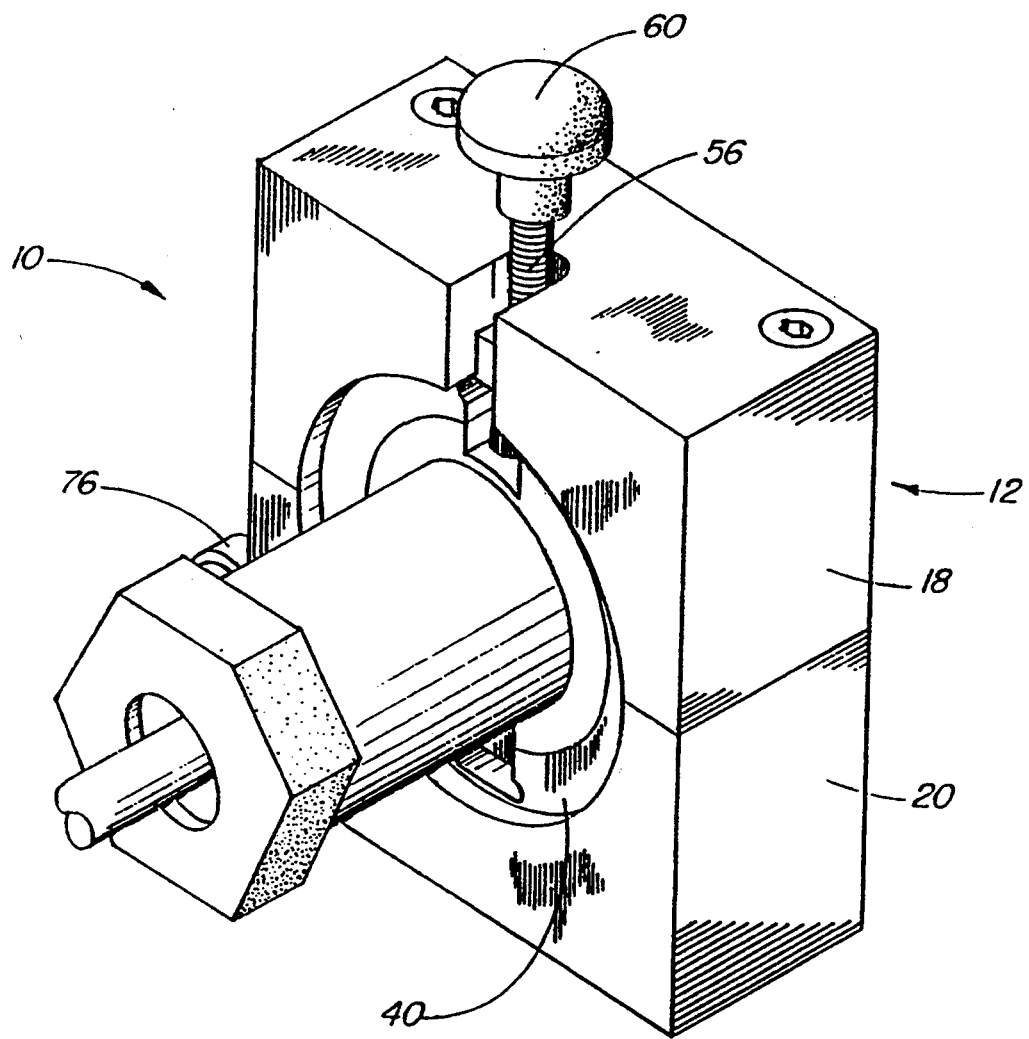
FIG. 5 is a perspective view of the first embodiment of an assembled tightening fixture showing a chuck mounted therein.

To use the tightening fixture of the present invention, a chuck is inserted into the torque transmitting collar 40 so that one keyway on the chuck engages with the key 50 of the torque transmitting collar 40 as shown in FIG. 5. The chuck lock screw 56 is then tightened until it engages the opposite keyway in the chuck. Once the chuck is secured within the tightening fixture 10, a conventional hex type wrench or spanner wrench can be used to tighten the lock nut on the chuck. Because the chuck is held nonrotatable with respect to the collar 40, the torque applied to tighten the lock nut causes the torque transmitting collar 40 to rotate. The actuator rod 72 is engaged by the notch in the underside of the torque transmitting collar 40 as the torque transmitting collar rotates against the actuator rod 40. The actuator rod 40 is axially displaced and presses simultaneously against the resistance means 74 and push rod 84 of the dial indicator 76 causing a corresponding movement of the pointer 82. When the torque is removed, the resistance means 74 urges actuator rod 72 back to non-indicating position.

In this first embodiment of the invention, the torque indicator assembly is comprised of a torque measuring device for measuring force at a known distance from the center of the chuck. The product of this force and distance then yields the torque at the locknut.

With this in mind it should be appreciated that there are many other devices that could be used to measure force transmitted to the actuating rod 72. Given a force transmitted by the torque transmitting collar 40 to the actuating rod 72, the torque indicator assembly could be a force measurement device such as a piezoelectric crystal in which the force exerted upon the crystal would cause a change in voltage across the crystal, and such a change could be converted to an equivalent force.

In the alternative, a hydraulic arrangement in which the actuator rod 72 acts upon a piston of know diameter within a pneumatic line may be utilized. A force upon the piston will generate pressure in the pneumatic line which may be measured by a pressure gauge attached to the line. Knowing the pressure and the piston diameter, the force upon the piston may be calculated. This force, in conjunction with the distance of the actuator rod 72 from the chuck centerline or fixture center, may be used to calculate torque.

In a second embodiment of the invention, the torque indicator assembly shown in FIG. 1 with the associated actuator rod 72 is replaced by a torque indicator assembly 200, shown in FIGS. 6–11. While the actuator rod 72 in FIG. 1, was compressed against a torque indicator assembly with resistance, in FIG. 1, the assembly 200 shown in FIGS. 6–11 does not depend upon compression of an actuator rod but upon bending of a cantilevered member extending between the block 12 and torque transmitting collar 40 for resistance.

The details of the tightening fixture shown in FIGS. 6–11 are identical to those in FIGS. 1–5 in all respects except those details associated with this torque indicator assembly and with the addition of a tapered chuck for illustration. As such, item numbers will remain the same for those similar items.

It should be noted that the chuck 150 with centerline 152 is of the tapered type and fits into the opening of the torque transmitting collar 40 until the shoulder 155 of the taper chuck 150 abuts with the shoulder 46 of the collar. The key 50 of the collar also engages the keyway 160 within the shoulder 155 of the chuck 150. At this point, the chuck lock screw 56 is advanced through the hole 58 in the collar 40 until the screw 56 enters the keyway 160 in the shoulder 155 of the tapered chuck 150. The screw 56 is advanced further to secure the chuck 150 within the collar 40. Once the chuck 150 is secured within the fixture, the locknut 165 may be rotated and tightened to a desired torque to secure the tool 170 within the chuck 150.

However, in the second embodiment of the invention the actuator rod 72 has been removed and replaced with a cantilevered member 205 (FIG. 7) secured to a base 210. To the member 205 is attached a displacement measuring means 215, such as a strain gauge, so that when the base 210 is fixed and a force "F" is exerted upon the member 205, a bending moment M is generated causing tension and expansion of the wall 217 of the member 205. Strain gauges are typically used to measure displacement by measuring the change in electrical resistance across two terminals in the gauge caused by deformation of the gauge. Knowing the characteristics of the member 205 in bending, this expansion which deforms the strain gauge may then be associated with force F at a specific location upon the member. Given a range of forces F, then for each force the expansion and resultant change in resistance at the strain gauge could be monitored to establish calibration curves for the torque indicator assembly.

For measuring resistance, wires 225 and 230 extend from the strain gauge 215.

Figure 8:
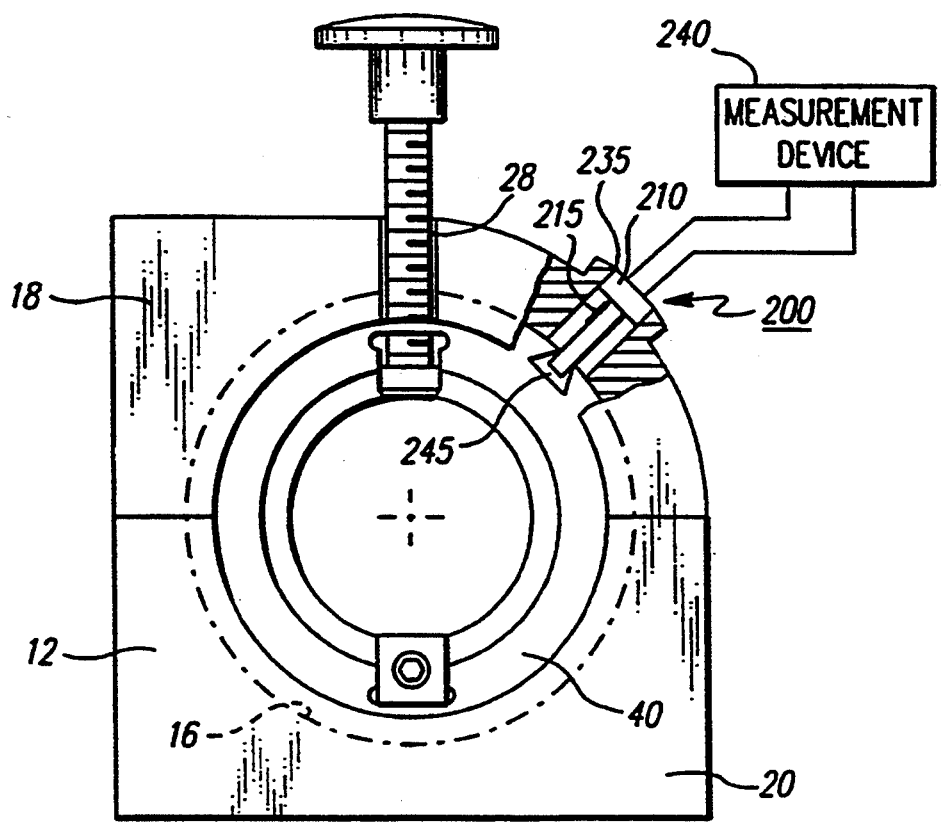
FIG. 8 is a front elevation view of the second embodiment of the present invention with portions thereof shown in section to illustrate the invention.

As shown in FIG. 8, the torque indicator assembly 200 is mounted within an opening 235 in the top half 18 of the stationary support block 12. Note that one corner of the block 12 has been rounded to accommodate the assembly 200. This is only for convenience; the assembly 200 could have been attached to the block 12 shown in FIG. 1.

Returning to FIG. 8, the opening 235 extends through the block 12. The base 210 of the assembly 200 is secured within the opening 235 of the block 12. This may be accomplished through a friction fit in which the base 210 is slightly larger than the opening 235 such that the base 210 may be urged into, and thereafter remains, within the opening 235. In the alternative the base 210 may be secured to the block 12 using adhesive or other bonding techniques.

Briefly returning to FIG. 7, it is important to realize that the location of the force "F" acting upon the member 205 affects the deflection at the strain gauge 215. As an example, if the force "F" were to be applied at a location along the member 205 closer to the base 210, then the deflection occurring at the strain gauge 215 would be smaller. From this it should be appreciated that the measurement on the strain gauge 215 is a function of both the magnitude of the force and the location of the force along the member 205.

For this reason, in FIG. 8 the assembly 200 should be positioned within the opening 235 of the block 12, so that the torque transmitting collar 40 applies a force at a specific and predetermined location on the member 205, where the strain gauge has been calibrated.

Figure 9:
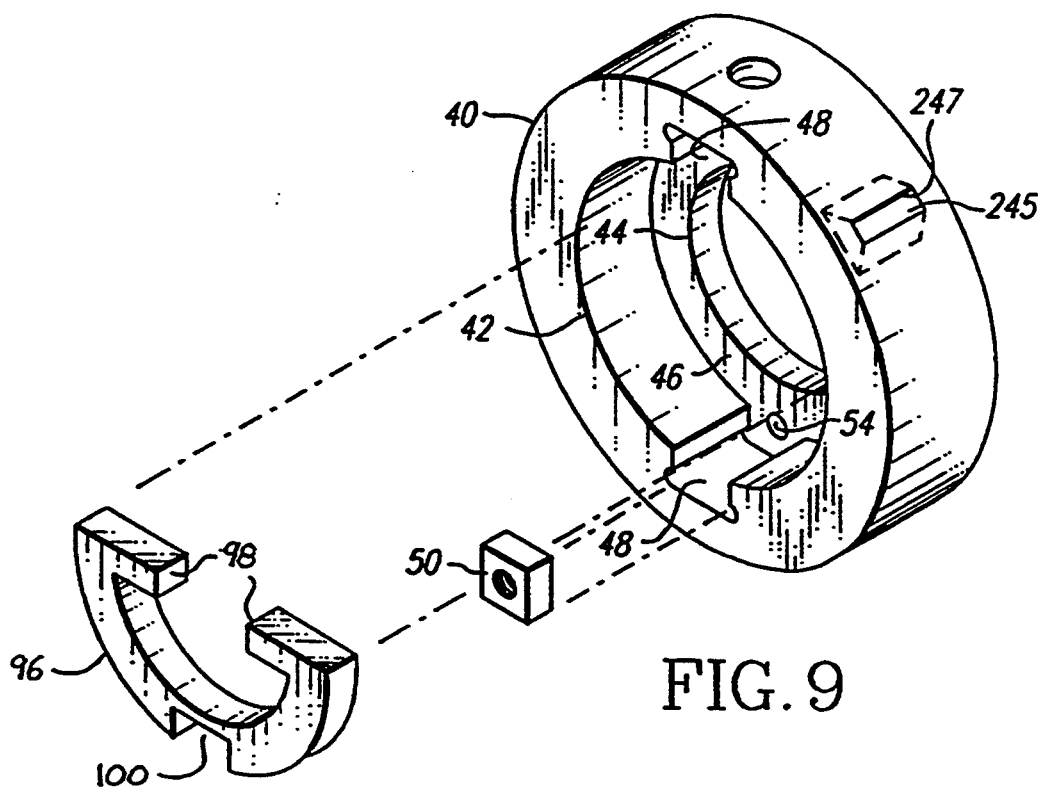
FIG. 9 is a perspective view of the torque transmitting collar and adapter plate used in the second embodiment of the present invention.

In order to accomplish this, as opposed to an elliptical notch 45, shown in FIG. 4(b) used to engage the actuator rod 72, FIG. 9 shows the torque transmitting collar 40 with a notch 245 extending within the collar 40 to receive the member 205 of the torque indicator assembly 200. Returning to FIG. 8, this same notch 245 within the collar 40 is shown in position with the torque indicator assembly 200. The torque indicator assembly 200 is positioned within the block 12 such that the cantilevered member 205 extends through the opening 235 in the block 12, into the notch 245 of the collar 40.

Figure 7:
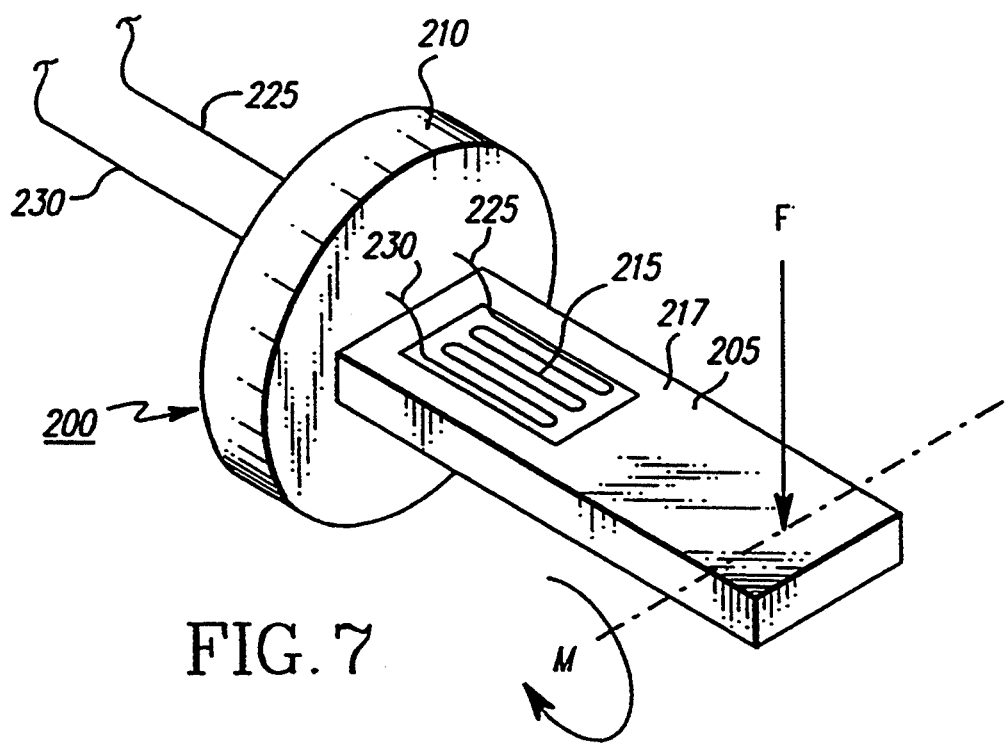
FIG. 7 is an isometric view of the cantilever member of the torque measuring device in the second embodiment of the present invention.

When the collar 40 is rotated, the notch 245 contacts the member 205 at approximately the same position as that of the force "F" shown in FIG. 7. The member 205 is deliberately positioned for this alignment. In such a manner, calibration already performed upon the torque indicator assembly 200 may be utilized. It is possible that the contact between the cantilevered member 205 and the notch 250 of the collar 40 may not be at a single point and, as such, one design option that may be exercised would include dovetailing the notch 245 such that the point of contact of the collar 40 with the member 205 would be along an edge 247 at the outer perimeter of the collar 40. Given the arrangement shown in FIG. 8, as the collar 40 is rotated in a clockwise direction, a force would be exerted upon the member 205 thereby imposing a bending moment causing the outer fiber of the member 205 to expand, thereby displacing the strain gauge 220.

The wires 225 and 230 extend from the torque indicator assembly 200 to a measurement device 240. Such measurement devices are capable of determining the change in resistance of the strain gauges 215 caused by deflection of the member 205 and, as previously discussed, with such information, the force "F" acting upon the member 205 may be determined. Such measurement devices 240 are well known to those skilled in the art. As mentioned earlier, given the force and the known distance between the edge of the collar 40 and the chuck centerline, the torque exerted upon the chuck may be easily determined.

As discussed earlier, the actuator 72 shown in FIG. 3 and utilized for the first embodiment of this invention is not required for the torque indicator assembly 200 of the second embodiment of this invention. For that reason, the cross-section shown in FIG. 3 with the actuator rod 72, is modified in FIG. 10 to address the second embodiment such that the collar 40 and the lower half 14 of the block 12 may be solid in the region where the actuator rod 72 once was.

Figure 6:
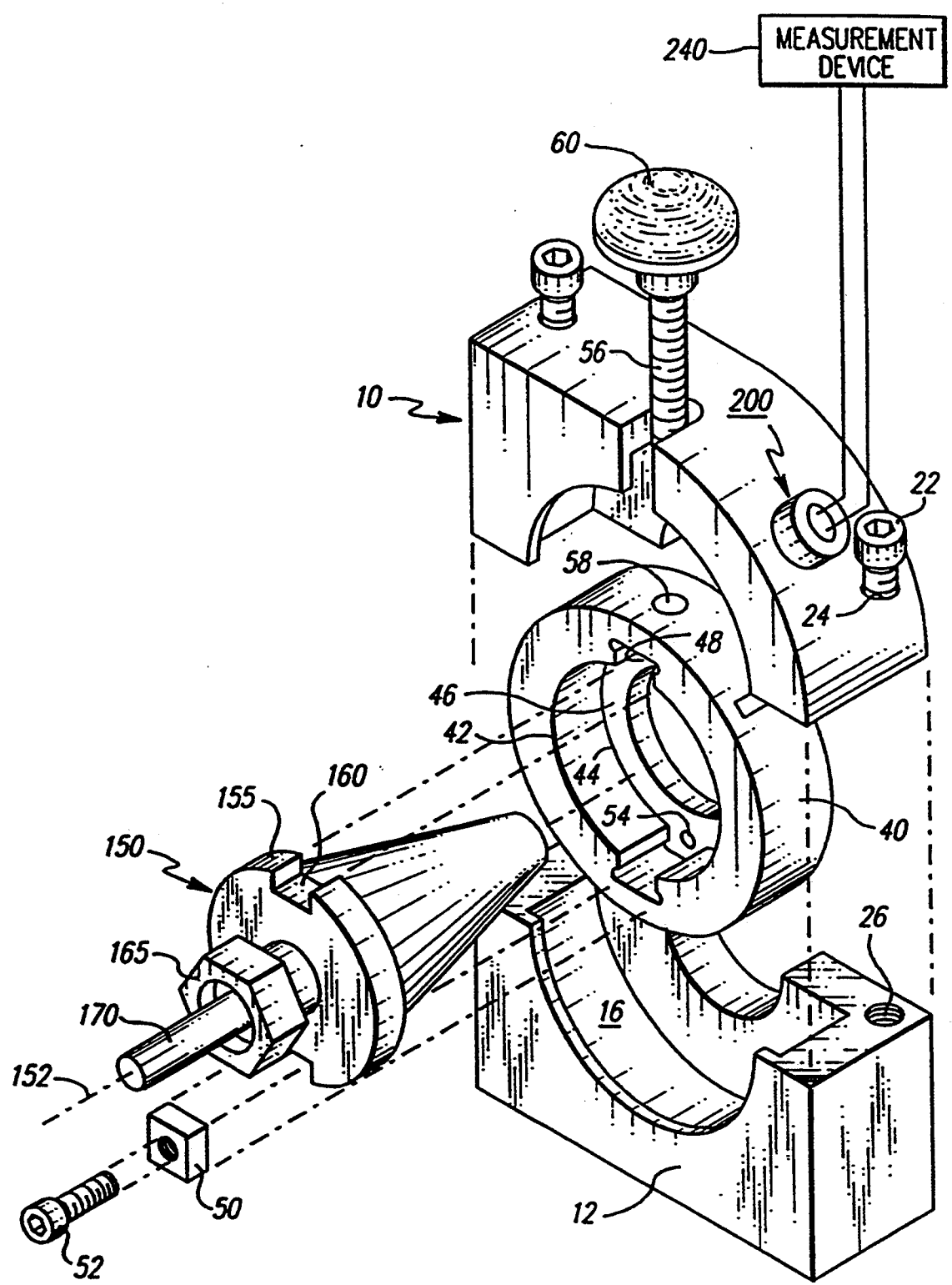
FIG. 6 is an exploded perspective view of the second embodiment of the present invention.
Figure 10:
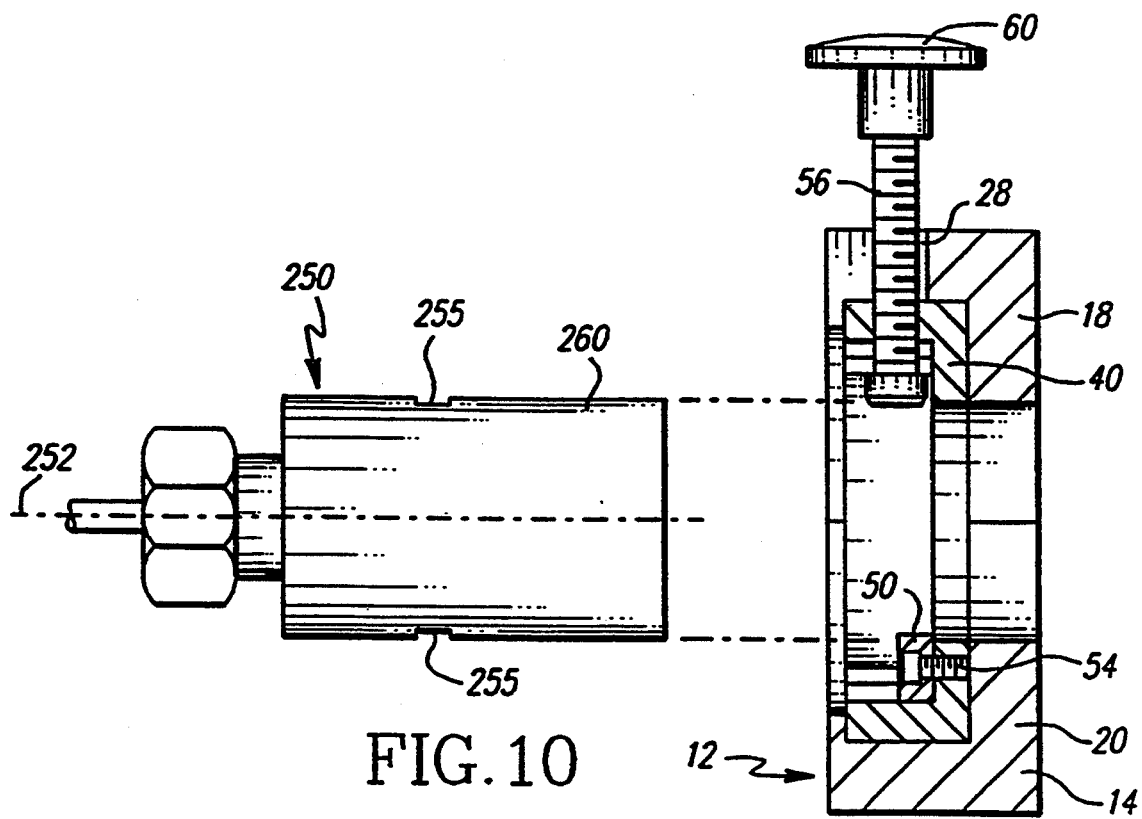
FIG. 10 is a section view of the second embodiment of the present invention taken through a plane parallel to the sides of the support block.

It should be appreciated that the tapered chuck shown in FIG. 6 is not the only type of chuck the tightening fixture may hold. As shown in FIG. 10, a straight shank chuck 250 with centerline 252 may also be secured within the tightening fixture. However, as opposed to the shoulder 155 of the tapered chuck 150, the straight shank chuck will have flat surfaces 255 on opposing portions of the shank 260. In this manner, the chuck 250 may be advanced within the collar 40 of the tightening fixture until the flat portions 255 of the shank 260 are aligned with the key 50 and the chuck lock screw 56. At this point, as before, the chuck lock screw 56 may be advanced to secure the shank 260 within the collar 40 and, furthermore, within the tightening fixture. It should be appreciated that the only requirement for the tightening fixture to function properly is that the rotation of a chuck secured within the tightening fixture is restricted. It is not necessary to secure the chuck axially; however, in such a situation the chuck is less likely to become dislodged from the tightening fixture.

Figure 11:
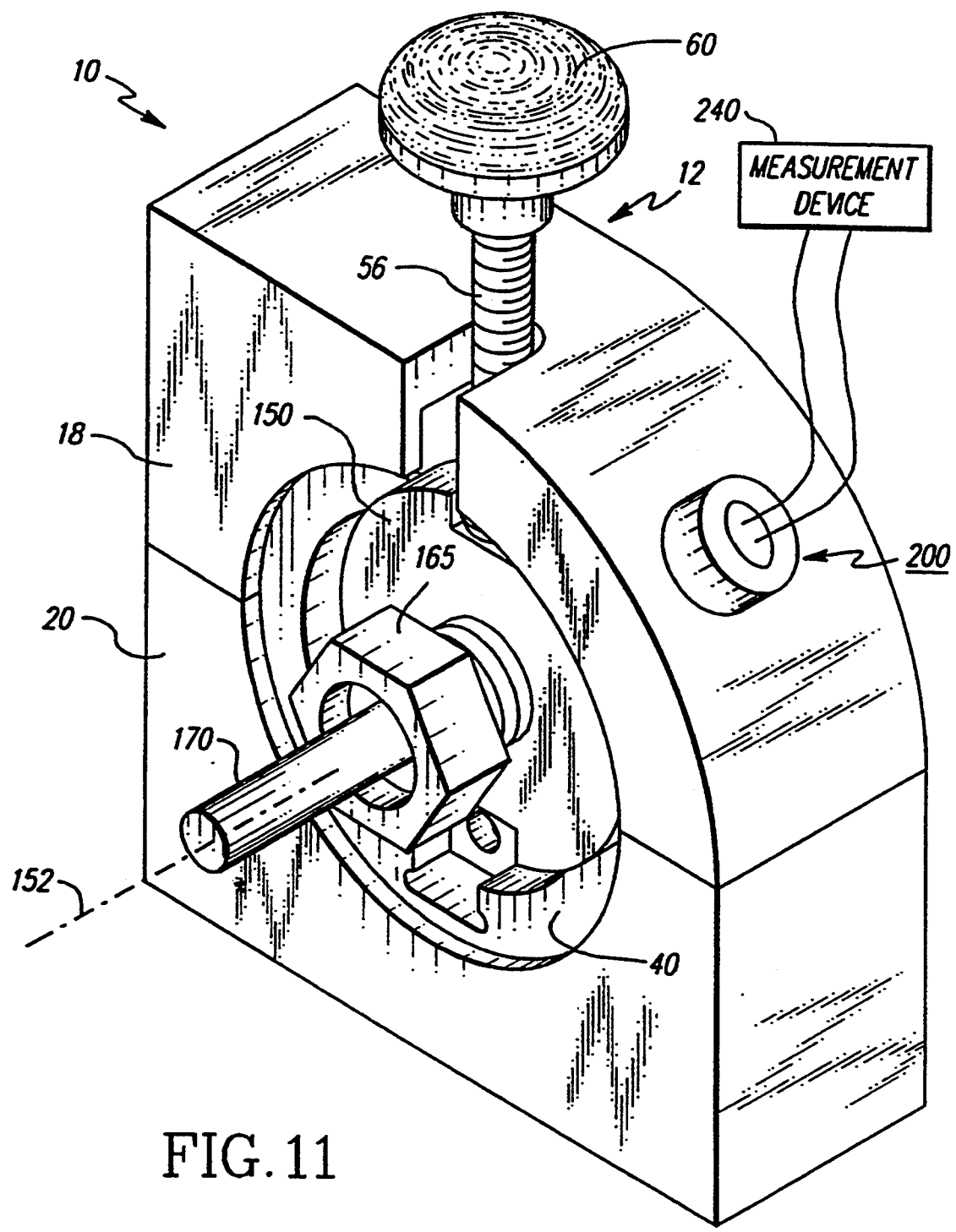
FIG. 11 is a perspective view of the second embodiment of an assembled tightening fixture showing a chuck mounted therein.

FIG. 11 shows the exploded view in FIG. 6 in an assembled state. As can be seen, the tapered shank chuck 150 is secured within the collar 40 and thereby secured within the tightening fixture. In order to tighten the tool 170 within the chuck 150, it FIG. 7 and FIG. 8 show the member 205 having a strain gauge 215 on only one side 217 of the member 205. Since strain gauges 215 are most effective when elongated, the arrangement shown in FIG. 8 is most effective for clockwise rotation of the collar 40. A second strain gauge may be located on the opposite side of the member 205 such that the force generated by counter clockwise rotation of the collar 40 may also be monitored. It should be appreciated that while FIGS. 6–11 show the cantilevered member 205 secured to the stationary support block 12 and engaging a notch 245 within the collar 40, the cantilevered member 205 may, in the alternative (not shown), be secured to the collar 40 and engage a notch in the stationary block 12.

FIG. 9 illustrates the torque transmitting collar 40 and the notch 245. The radial location of the notch 245 on the collar 40 can be in a number of locations about the circumference of the collar 40. The only limitation is that such an arrangement does not physically interfere with other portions of the tightening device. It was earlier pointed out that the upper half 18 of the block 12, shown in FIG. 8, includes a rounded corner. The torque indicator assembly 200 could just as well have been positioned at another portion of the block 12 and, if this were the case, the notch 245 in the collar 40 would likewise be located at another position about the circumference of the collar 40.

FIG. 9 also shows an adaptor similar to that shown in FIG. 4(a). This detail is included to illustrate that the only change to the collar 40 is the addition of the notch 245 about the circumference of the notch 40. The adaptor features shown in FIG. 9 are identical to those shown in FIG. 4(a), and the discussion related to that figure also applies to FIG. 9. is necessary to rotate the nut 165 to secure the jaws (not shown) of the chuck 150 about the tool 170. With the chuck 150 in the tightening fixture, when the nut 165 begins to tighten about the chuck 150, the chuck 150 will be urged to rotate, thereby also urging the collar 40 to rotate. When the collar 40 rotates, the cantilevered member (not shown) of the torque indicator assembly 200 which is engaged within the notch (not shown) will be displaced by the rotation of the collar 40. With the torque indicator assembly 200 calibrated, the displacement at the strain gauge 215 will be converted to a force at the circumference of the collar. Once this force is known and the distance from the circumference of the collar to the centerline of the chuck is known, it is a simple calculation to determine the torque exerted about the locknut 165. In this manner, the torque about the locknut 165 may be monitored and the optimum torque thereby selected.

The present invention may, of course, be carried out in other specific ways then those herein set forth without departing from the spirit and essential characteristics of the invention. The present embodiments are therefore to be considered in all respects as illustrative and not restrictive and all changes coming within the meaning and equivalency range of the appended claims are intended to be embraced therein.

What is claimed is:

1. A tightening fixture for holding a chuck and indicating the torque applied to a lock nut attached to the chuck while the nut is rotatably tightened on the chuck about the chuck centerline, comprising:
   (a) a stationary block;
   (b) a torque transmitting collar for receiving and holding the chuck, said collar being mounted to permit rotation in the stationary block about the chuck centerline;
   (c) locking means for holding the chuck nonrotatable with respect to the collar so that the chuck and collar rotate as a unit; and
   (d) torque indicator means responsive to the rotation of the collar for indicating the tightening torque being applied to the lock nut of the chuck wherein the torque indicator means is comprised of a resistance means for providing resistance to rotation of the collar and a displacement measuring means for determining the tangential force on the collar at a known distance from the chuck centerline as a result of a torque applied to the lock nut; and
   (e) said stationary block including an annular recess and the torque transmitting collar is mounted to permit rotation in the annular recess.

2. The tightening fixture of claim 1 wherein the resistance means is a spring having a known spring rate acting upon an actuator rod secured to and extending through the stationary block to engage the collar and wherein the displacement measuring means a displacement indicator for measuring the spring displacement to determine a force which in conjunction with the distance of the force from the chuck centerline may be used to determine torque on collar and lock nut.

3. The tightening fixture of claim 2 wherein the collar has a notch and the actuator rod contacts the notch to engage the collar.

4. The tightening fixture of claim 3 wherein the locking means for holding the chuck nonrotatable with respect to the collar comprises a key fixed to the collar for engaging with a keyway on the chuck.

5. The tightening fixture of claim 4 wherein the collar has a threaded opening and a chuck lock screw therethrough such that the chuck lock screw may be adjusted to secure the chuck within the collar.

6. The tightening fixture of claim 1 wherein the resistance means is a cantilevered member having a known spring rate secured to one of the stationary block or the collar and engaged with the other and wherein the displacement measuring means is at least one attain gage attached to the cantilevered member to determine force through displacement of the cantilevered member which in conjunction with the distance of the force from the chuck centerline may be used to determine torque on the collar and lock 7. The tightening fixture of claim 6 wherein the cantilevered member is secured to the stationary block and the collar has a notch into which the cantilevered member fits to engage the collar.

8. The tightening fixture of claim 6 wherein the cantilevered member is secured to the collar and the stationary block has a notch into which the cantilevered member fire to engage the stationary block.

9. The tightening fixture of claim 1 wherein the locking means for holding the chuck nonrotatable with respect to the collar comprises a key fixed to the collar for engaging with a keyway on the chuck.

10. The tightening fixture of claim 9 wherein the collar has a threaded opening and a chuck lock screw therethrough such that the chuck lock screw may be adjusted to secure the chuck within the collar.

11. The tightening fixture of claim 1 further including at least one chuck adapter and means for mounting the chuck adapter to the torque transmitting color for adapting the tightening fixture to receive chucks of different sizes.

12. The tightening fixture of claim 11 wherein the chuck adapter includes a semi-circular adapter plate having at least one key for insertion into a keyway of the chuck to be held by the adapter.

13. A tightening fixture for holding a chuck and indicating the torque applied to a lock nut attached to the chuck while the nut is rotatably tightened on the chuck about the chuck centerline, comprising:
   (a) a stationary block with an annular recess;
   (b) a torque transmitting collar for receiving and holding the chuck, said collar being mounted to permit rotation in the annular recess of the stationary block about the chuck centerline;
   (c) locking means for holding the chuck nonrotatable with respect to the collar so that the chuck and the collar rotate as a unit; and
   (d) torque indicator means responsive to the rotation of the collar for indicating the tightening torque being applied to the lock nut of the chuck, said torque indicator means comprised of:
   (i) a resistance means for providing resistance to rotation of the collar comprised of a cantilevered member having a known spring rate secured to one of the stationary block or the collar and engaged with the other; and
   (ii) a displacement measuring means for determining the tangential force on the collar at a known distance from the chuck centerline as a result of a torque applied to the lock nut comprised of at least one strain gage attached to the cantilevered member to determine force through displacement of the cantilevered member which in conjunction with the distance of the force from the chuck centerline may be used to determine torque on the collar and lock nut.

* * * * *